United States Patent [19]

Niedenzu et al.

[11] Patent Number: 5,501,732
[45] Date of Patent: Mar. 26, 1996

[54] PROCESS FOR PREPARING SILANIZED TIO$_2$ PIGMENTS USING A MEDIA MILL

[75] Inventors: Philipp M. Niedenzu, New Johnsonville; Scott M. Herkimer, Dickson; Ronald L. Chaney, McEwen, all of Tenn.

[73] Assignee: E. I. Du Pont de Nemours and Company, Wilmington, Del.

[21] Appl. No.: 392,706

[22] Filed: Feb. 23, 1995

Related U.S. Application Data

[63] Continuation-in-part of Ser. No. 203,144, Feb. 28, 1994, abandoned.

[51] Int. Cl.$^6$ ........................................................ C09C 1/36
[52] U.S. Cl. ...................... 106/447; 106/287.16; 106/445; 106/446
[58] Field of Search .................................. 106/445, 446, 106/287.16, 447

[56] References Cited

U.S. PATENT DOCUMENTS

| | | | |
|---|---|---|---|
| 3,915,735 | 10/1975 | Moreland | 106/490 |
| 4,141,751 | 2/1979 | Moreland | 106/445 |
| 4,989,794 | 2/1991 | Askew | 241/16 |
| 5,083,712 | 1/1992 | Askew | 241/16 |

FOREIGN PATENT DOCUMENTS

| | | |
|---|---|---|
| 88180A | 11/1991 | Australia . |
| 58-099121 | 6/1983 | Japan . |
| 60-210521 | 10/1985 | Japan . |
| 1442756 | 7/1976 | United Kingdom . |

OTHER PUBLICATIONS

Witucki, Gerald L., A Silane Primer: Chemistry and Applications of Alkoxy Silanes, *Journal of Coatings Technology*, 65, No. 822, 57–60, Jul. 1993.

Plueddemann, E. P., *Methods of Silane Addition to Fillers, Silane Coupling Agents*, 200–205, 1982, no month.

Union Carbide Corporation, *Filler Treatment*, 1968 No Month.

Derwent Abstract 85–305852/49 of JP 60–210521 (Oct. 1985).

Derwent Abstract 83–714584/29 of JP 58–099121 (Jun. 1983).

*Primary Examiner*—Mark L. Bell
*Assistant Examiner*—Scott L. Hertzog

[57] ABSTRACT

Disclosed is an improved process for preparing a silanized TiO$_2$ pigment by media milling.

8 Claims, No Drawings

PROCESS FOR PREPARING SILANIZED TIO₂ PIGMENTS USING A MEDIA MILL

CROSS-REFERENCE TO EARLIER FILED APPLICATION

This application is a continuation-in-part of pending application Ser. No. 08/203,144 filed Feb. 28, 1994, abandoned.

BACKGROUND OF THE INVENTION

The present invention relates to an improved process for preparing $TiO_2$ pigment for plastic and coating applications using a $TiO_2$ slurry as a feedstock. More particularly, this invention relates to a slurry process for preparing a silanized $TiO_2$ pigment for plastic and coating applications.

$TiO_2$ is generally produced by hydrolyzing an aqueous solution of titanium sulfate and calcining the hydrolyzate at 750° to 1000° C., or oxidizing titanium tetrachloride at elevated temperatures followed by cooling to temperatures below 600° C. A resulting slurry is formed by the addition of water to the $TiO_2$ pigment. Certain finishing steps are required to be performed on the resulting slurries such as filtering, washing, drying and fluid energy milling. A fluid energy mill, also referred to as a micronizer, involves introducing dry $TiO_2$ pigment and a fluid, e.g., air or steam into the outer portion of an inwardly spiraling vortex so as to convey the $TiO_2$ at high velocity against the housing of the spiral vortex to fracture agglomerates as described in U.S. Pat. No. 4,427,45 1. Nonetheless, such milling is expensive and energy intensive. Fluid energy milling requires high energy input and intensive agitation.

U.S. Pat. No. 3,834,924 discloses surface modified pigments produced by adding amino organosilane to a pigment dispersion directly in a suitable solids mixing apparatus. The process therein eliminates the need for filtration, however, conventional finishing steps such as fluid energy milling are not mentioned.

U.S. Pat. No. 4,061,503 and U.S. Pat. No. 4,151,154 describe enhanced dispersibility of $TiO_2$ in paints and plastics. Therein, the $TiO_2$ is surface treated with a silane possessing at least two hydrolyzable groups bonded to silicon and an organic group containing a polyalkylene oxide group. In a U.S. Pat. No. 4,061,503 Example, the use of silane reduced the grinding time of $TiO_2$ pigment for use in a water reducible enamel and post treatment of silane to $TiO_2$. Each of the prior art processes suffers from various deficiencies and further improvements are desirable.

This invention provides a step forward in preparing $TiO_2$ for pigmenting plastics and coatings. The present invention provides numerous advantages. Mechanical handling of the high solids slurry is made easier by lowering its viscosity, and eliminating the need for fluid energy milling results in a more economical, less energy intensive process. In addition, media milling eliminates the need for an additional step after drying to reduce the particle size further.

SUMMARY OF THE INVENTION

In accordance with this invention, there is provided an improved process for preparing a silanized $TiO_2$ pigment by media milling. The resultant pigment is particularly suitable for use in plastics and surface coatings. This improved process comprises first reducing the viscosity of a high solids $TiO_2$ pigment slurry. This may be accomplished by either adjusting the pH in the range of about 7.5 to about 11 with caustic or the like, or contacting the slurry with a reducent. Next, the slurry is treated with an organosilicon reagent. This step is preceded and/or followed by media milling the high solids slurry to reduce the $TiO_2$ particle size. The slurry is then dried as a product; hence no post drying manipulation to control pigment properties such as particle size distribution is required.

DETAILED DESCRIPTION OF THE INVENTION

The $TiO_2$ pigment useful in the process of this invention generally are in the rutile or anatase crystalline form and can be produced by a chloride process or sulfate process. Both the sulfate and chloride processes are described in greater detail in "The Pigment Handbook", Vol. 1, 2nd Ed., John Wiley & Sons, NY (1988) the teachings of which are incorporated herein by reference. The invention relates to a high solids aqueous $TiO_2$ slurry. "High solids" refers herein to a solids content typically greater than about 30% by weight based on the total weight of the slurry. Preferably, the $TiO_2$ solids content of the slurry will be from about 30 to about 85 wt. %.

A typical overall process of the present invention is as follows: a base $TiO_2$ pigment→slurry(about 30-about 85% solids)→ reduce viscosity→ optional media mill→ organosilicon reagent treatment→ media mill→ improved slurry→ drying.

The $TiO_2$ employed in the preparation of the slurry will preferably have a narrow particle size range with at least 95 wt. % in the form of particle agglomerates having an equivalent spherical diameter less than about 7 microns, and an average primary particle size less than about 0.4 microns.

The $TiO_2$ pigments may also contain ingredients added thereto to improve dispersibility characteristics or other properties such as durability. Thus, by way of example, but not limited thereto, the pigment may contain additives and/or inorganic oxides, such as aluminum, silicon, tin, as well as triethanol amine, trimethylolpropane, phosphates, etc.

First, the base pigmentary $TiO_2$ is dispersed in an aqueous slurry and the viscosity of the slurry is reduced to a minimum of about 2000 centipoise (cps). Sufficiently low viscosity is required in order for the slurry to be fed into a media mill without significant plugging. This may be accomplished by adjusting the pH within the range of about 7.5 to about 11 by adding caustic or the like, e.g., dilute NaOH. A preferable pH range is about 9 to about 11. Alternatively, the slurry may be treated with a reducent. By way of example, but not limited thereto, reducents include triethanol amine (TEA), 2-amino-2-methyl-1-propanol (AMP), trimethylol propane (TMP), tetrapotassium pyrophosphate (TKPP) or the like and mixtures thereof. "Reducent" is used herein to refer to a dispersant which when added to a slurry reduces the viscosity of the slurry sufficiently to avoid significantly plugging a media mill. Typically, the amount of reducent is in the range of about 0.1 to 5% by weight, based on the weight of $TiO_2$. It will be appreciated by those skilled in the art that the reducent is used advantageously when there is no need otherwise to filter or wash the slurry.

Next, the slurry is treated with at least one organosilicon reagent having the general formula:

wherein

R is nonhydrolyzable aliphatic, cycloaliphatic or aromatic group having at least 1 to about 50 carbon atoms;

R' is a hydrolyzable group such as an alkoxy, halogen, acetoxy, hydroxy or mixtures thereof; and x=1 to 3.

By way of example, but not limited thereto, suitable silanes include vinyltriethoxy silane, butyltrimethoxysilane, hexyltrimethoxysilane, octyltriethoxysilane, nonyltriethoxysilane, etc. Additional examples of silanes include R=8–18 carbon atoms; R'= chloro, methoxy, hydroxy or mixtures thereof; and x=1 to 3. It is believed that the present invention is also applicable to fluoroorganosilicon compounds, i.e., wherein R is fluorine substituted, such as $C_nF_{2n+1}$ wherein n=8, 10, 12 or mixtures thereof; R' is a hydrolyzable group such as an alkoxy, halogen, acetoxy, hydroxy or mixtures thereof; and x=1 to 3. For example, suitable fluoroorganosilicon compounds include, but are not limited thereto, trichloroperfluoroethylsilane, trichloroperfluorodecylsilane, and trichloroperfluorododecylsilane.

Alternatively, at least one polysiloxane can be useful in carrying out the invention. Polysiloxanes having the formula:

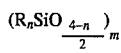

wherein

R is organic or inorganic groups;

n=0–3; and m≥2 are suitable.

For example, but not limited thereto, polydimethylsiloxane (PDMS) vinylphenylmethyl terminated dimethylsiloxanes, divinylmethyl terminated, polydimethylsiloxane and the like are suitable polysiloxanes. Mixtures of organosilicon compounds are contemplated equivalents. "Silanized" $TiO_2$ is defined herein to refer to $TiO_2$ treated with at least one silane and/or fluoroorganosilane, or a mixture of at least one silane and/or fluoroorganosilanes and at least one polysiloxane (collectively referred herein as organosilicon compounds).

The $TiO_2$ surface in current commercially available slurries is not generally water repellent, i.e., hydrophobic. It is desirable to have the $TiO_2$ particle surface hydrophobic for use in plastics and surface coatings when the pigment is prewetted with an organosilicon reagent for end-use in organic matrices such as plastics and coatings. It is believed that the organosilicon reagent renders the $TiO_2$ particulate surface hydrophobic.

Typically, the amount of organosilicon reagent suitable for processing $TiO_2$ in plastics or surface coatings is in the range of about 0.1 to 5% by weight, based on the weight of silanized $TiO_2$ pigment. Preferably, about 0.5 to about 3 wt. % is suitable. In excess of 5 wt. % may be used but no particular advantage is observed.

The organosilicon reagent is commercially available or can be prepared by processes known in the art such as those described in "Organosilicon Compounds", S. Pawlenko, New York (1980), the teachings of which are incorporated herein by reference. The organosilicon reagent treatment can be carried out by any suitable means such as by injecting a solution into the slurry, by dripping with agitation or the like. If present as a mixture, the polysiloxane addition can be made in conjunction with the silane or post addition to the silane.

Media milling the slurry can be done either before and/or after the organosilicon reagent is added. The media milling of the slurry is done in a continuous or batch mode. The titanium dioxide slurry having particle agglomerates less than 50 microns is fed into a grind chamber which is packed with media beads. Media of different types and sizes may be used, with one of ordinary skill in the art being able to adjust the media to produce the desired result based on the size distribution of the particles in the starting material according to conventional protocols. Typically, the media is forced to move around a grind chamber by a series of discs attached to a rotating shaft. The motion of the media is perpendicular to the direction in which the slurry is pumped. Therefore, the $TiO_2$ particle agglomerates are sheared by the media. Typically, a set of screens keeps the media inside the grind chamber but allows the smaller $TiO_2$ particles to exit out of the mill. Optionally, the product of the mill can be further screened. The grinding residence time (flow rate of the slurry) will vary depending on the size of the media mill. For example, the slurry is processed through the media mill at about 0 to 7 gallons per minute (gpm) [about 0 to 26.5 liter per minute (lpm)] preferably about ½ to 3 gpm [about 1.9 to 11.4 lpm] for a 60 liter media mill to achieve the desired particle size reduction. The desired particle size reduction will depend on the end use for the pigment. For example, the slurry is media milled until the diameter of $TiO_2$ particle agglomerates having a size of about 1–10 microns is reduced to 5 wt. % for use in a high gloss coating application, and the slurry is media milled until the diameter of $TiO_2$ particle agglomerates having a size of about 1–10 microns is reduced to 3 wt. % for use in plastics applications. Current industrial manufacture of $TiO_2$ pigment typically requires particle size reduction by fluid energy milling, e.g., micronizing. The present invention achieves particle size reduction with a media mill and obviates the need for the fluid energy mill.

Finally, the slurry is dried by any suitable means, such as flash drying, spray drying or an oven, to less than 1 wt. % water, preferably 0.7% or lower. The slurry can be packaged as a product for use in plastics and surface coatings.

The following examples are merely illustrative and not intended to limit the disclosure. Viscosity was measured on a Brookfield® Viscometer (Brookfield Engineering Laboratories, Inc., Stoughton, Mass.).

EXAMPLES

EXAMPLE 1

A $TiO_2$ pigment slurry, with 30 to 60 wt. % solids, and a viscosity of 2200 centipoise (cps), was treated with dilute NaOH to adjust the pH to 9 to 11, and slurry viscosity was thereby reduced to about 120 cps.

The slurry was then processed through a 60 liter media mill at 3 gpm (11.4 lpm) to achieve the desired particle size reduction; e.g., % mass coarser than 1.0 micron. The media mill's grind chamber was charged to about 85% capacity with 250 lbs. (93 kg) $ZrO_2/SiO_2$ media. The media nominal size range is 0.60–0.80 mm in diameter. The milling of the slurry was done in a continuous fashion. After passing through the grind chamber, the slurry is separated from the grinding media by a set of screens. At the discharge of the mill, the slurry was treated with 1 wt. % octyltriethoxysilane, and dried to less than 1 wt. % water. The diameter of the $TiO_2$ particle agglomerates having a size of about 1 micron was reduced by about 91% after media milling.

Other property improvements determined were tinting strength (TS) and undertone (UT). The $TiO_2$ pigment product was tested for TS and UT which are measures of optical properties in plastics applications. For these tests, the pigment was dispersed in black vinyl compound on a two-roll mill. The tristimulus values, X, Y, Z of the vinyl sheet were measured with a Hunterlab Labscan spectrocolorimeter (Hunter Associates Laboratory, Inc., Reston, Va.), and TS and UT were calculated versus standards prepared at the same time. TS and UT were derived from Y, and Z/X respectively. L*, a*, and b*, the color space coordinates defined by CIE (Commission Internationale de l'Eclairage) in 1976, were read directly on the spectrocolorimeter. The TS range for commercial TiO₂ pigments was about 80 to 120. The UT range was about −0.070 to +0.050. Averages for this example were:

TS=107(+/−2)

UT=0.034(+/−0.001)

These results were comparable to those for untreated TiO₂, which had been micronized, except that the TiO₂ from the example gave a slightly bluer undertone.

EXAMPLE 2

A TiO₂ pigment slurry, with 53 wt. % solids, and a viscosity of 8500 cps was treated with 0.2 ml of an organic dispersant, AMP (0.1% by weight) at room temperature and the slurry viscosity was thereby reduced to 20 cps.

The slurry was then processed through a 60 liter media mill at 3 gpm (11.4 lpm) to achieve the desired particle size reduction, e.g., % mass courser than 1.0 micron as in Example 1.

At the discharge of the mill, the slurry was treated with 0.8% by weight octyltriethoxysilane, stirred for 10 minutes at room temperature and dried to less than 1 wt. % water. The diameter of the TiO₂ agglomerates having a size of about 1 micron was reduced by about 91% after media milling. The treated, media milled TiO₂ pigment product was tested as in Example 1 for plastic applications. These results were comparable to those for untreated TiO₂ which had been micronized.

EXAMPLE 3

A TiO₂ pigment slurry, with 50 wt. % solids, and an unmeasurable viscosity (too high to be measured by the Brookfield® viscometer) is treated with caustic to adjust the pH to greater than 8.5 and the slurry viscosity is thereby reduced to 26–75 cps.

The slurry is then processed through a 60 liter media mill at 1 gpm (3.8 lpm) to achieve the desired particle size reduction, e.g., % mass courser than 1.0 micron as in Example 1.

At the discharge of the mill, the slurry is treated with 1% by weight butyltrimethoxysilane, stirred for 10 minutes at room temperature and dried to less than 1 wt. % water. The diameter of the TiO₂ agglomerates having a size of about 1 micron is reduced by about 91% after media milling. The treated, media milled TiO₂ pigment product is tested as in Example 1 for plastic applications. It is believed that these results would be comparable to those for untreated TiO₂ which are micronized.

EXAMPLE 4

Same as Example 3 except the organosilicon compound is a mixture of 1 wt % PDMS and 1 wt % octyltriethoxysilane. These results would be comparable to those for untreated TiO₂ which are micronized.

Having thus described and exemplified the invention with a certain degree of particularity, it should be appreciated that the following claims are not to be so limited but are to be afforded a scope commensurate with the wording of each element of the claim and equivalent thereof.

What is claimed is:

1. A process for preparing a high solids TiO₂ pigment comprising the steps of:
   (a) reducing the viscosity of a high solids TiO₂ pigment slurry by adjusting the pH in the range of about 7.5 to about 11;
   (b) media milling the slurry;
   (c) contacting the slurry with an organosilicon reagent; and
   (d) drying the slurry to less than 1 wt. % water.

2. The process of claim 1, wherein the viscosity is reduced by contacting the slurry with a reducent selected from the group consisting of triethanol amine, 2-amino-2-methyl-1-propanol, trimethylol propane and tetrapotassium pyrophosphate and mixtures thereof.

3. The process of claim 1 or claim 2, wherein the organosilicon reagent has the formula:

$$R_xSi(R')_{4-x}$$

wherein

R is nonhydrolyzable aliphatic, cycloaliphatic or aromatic group having at least 1 to about 50 carbon atoms;

R' is a hydrolyzable group selected from alkoxy, halogen, acetoxy, hydroxy and mixtures thereof; and x=1 to 3, and is present in the amount of about 0.1 to about 5% by weight, based on the weight of TiO₂.

4. The process of claim 3 wherein the organosilicon reagent is fluorine substituted and $R=C_nF_{2n+1}$ wherein n= 8, 10, 12 or mixtures thereof.

5. The process of claim 3 or claim 4 wherein the organosilicon reagent further comprises a polysiloxane having the formula:

$$(R_nSiO_{4-n/2})_m$$

wherein

R is organic or inorganic group;

n=0–3; and m≧2.

6. The process of claim 3 or claim 4 wherein the organosilicon reagent is selected from the group consisting of vinyltriethoxysilane, butyltrimethoxysilane, hexyltrimethoxysilane, octyltriethoxysilane, nonyltriethoxysilane, trichloroperfluoroethylsilane, trichloroperfluorodecylsilane and trichloroperfluorododecylsilane.

7. The process of claim 5 wherein the organosilicon reagent is selected from the group consisting of polydimethylsiloxane, vinylphenylmethyl terminated dimethylsiloxanes, divinylmethyl terminated and polydimethylsiloxane.

8. The process of claim 3, further comprising:
   (e) media milling the slurry after step (c).

* * * * *